UNITED STATES PATENT OFFICE.

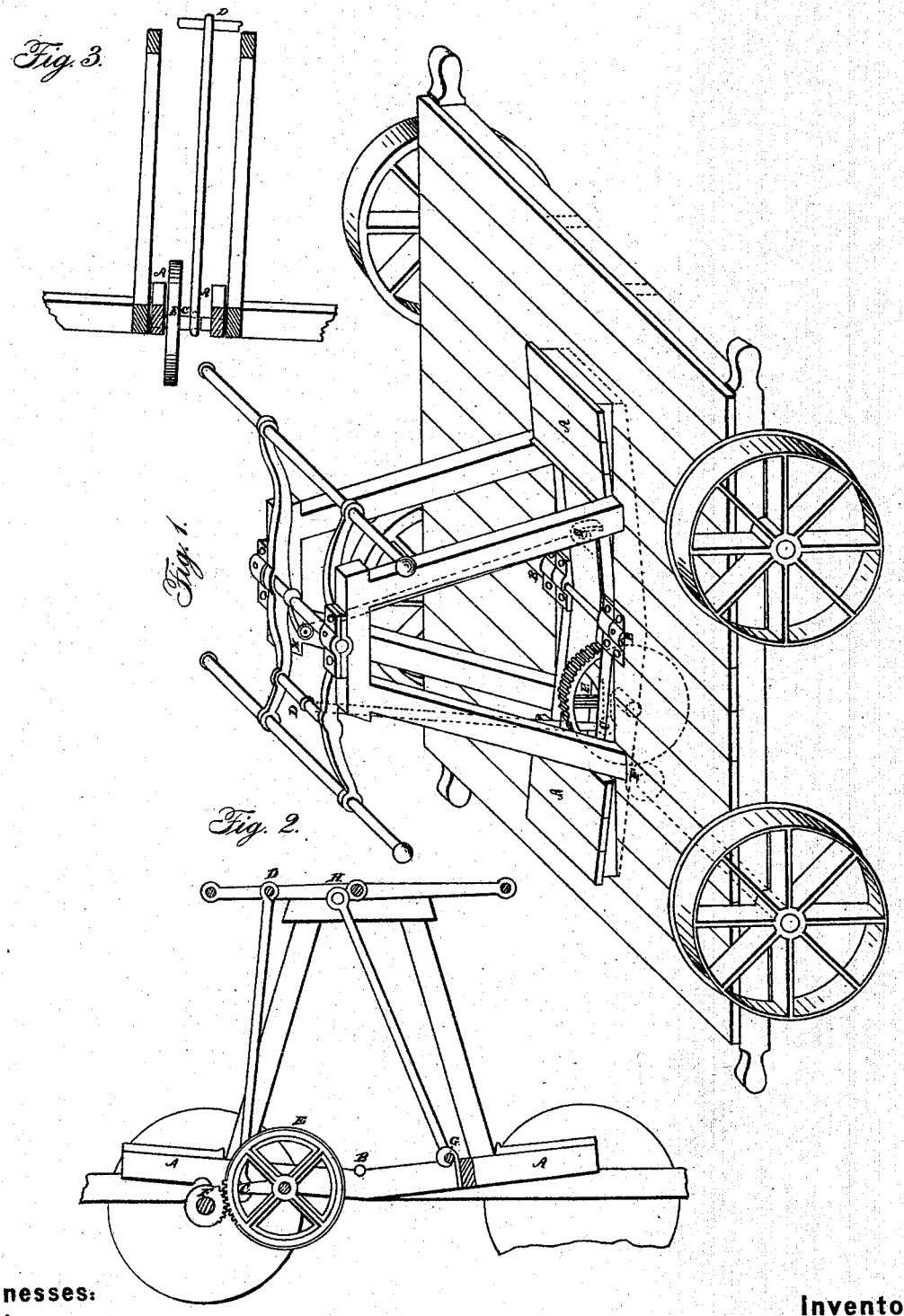

ANTHONY WELSCH, OF CHICAGO, ILLINOIS.

HAND-CAR FOR RAILROADS.

Specification of Letters Patent No. 26,453, dated December 13, 1859.

*To all whom it may concern:*

Be it known that I, ANTHONY WELSCH, of the city of Chicago, in the county of Cook and State of Illinois, have invented a new and useful Improvement on Railroad Hand-Cars; and I do hereby declare that the following is a full, clear, and exact description of the construction of the same, reference being had to the annexed drawings, making a part of this specification, in which—

Figure 1 is a perspective view of the car; Fig. 2, a longitudinal section, and Fig. 3 a cross section.

Similar letters refer to corresponding parts in the several figures.

A A is a platform working in bearings B B. Attached to this platform, and about midway between its center and end, is a crank C, which connects with the brakes at D. On the axle of this crank is fastened the wheel E, which works in the pinion F, on the axle of the car, and on the other side of the center of platform, at G, a rod is fastened, connecting with the brakes at H.

The operation is as follows: The persons working the car stand on the platform A A, which moves in its bearings B B, and as those on one end, in order to depress their side of the brakes, must bear heavily on them, thereby materially lessening their weight on the platform, while those on the other end engaged in raising their side will bear heavier on the platform, it will be seen that, on account of the connection of crank, wheel, and platform, the latter acts as a lever and in conjunction with the brakes gives a double action, whereby greater power is obtained and the weight of those working added thereto.

What I claim as my invention and wish to secure by Letters Patent is—

The movable platform; and the attachment thereto of the crank and wheel, in the manner and for the purposes set forth.

ANTHONY WELSCH.

Witnesses:
 THOS. MOFFET,
 WM. A. HENDRIC.